United States Patent
Chien

(10) Patent No.: US 7,721,028 B2
(45) Date of Patent: May 18, 2010

(54) KEYBOARD VIDEO MOUSE (KVM) SWITCH BETWEEN PLURALITY OF INTERNAL USB HUBS EACH ASSOCIATED WITH PLURALITY OF AUDIO CODECS CONNECTED TO THE DOWNSTREAM PORT OF ASSOCIATED USB HUB

(75) Inventor: Wei-Chen Chien, Sindian (TW)

(73) Assignee: ATEN International Co., Ltd., Shijr (TW)

( * ) Notice: Subject to any disclaimer, the term of this patent is extended or adjusted under 35 U.S.C. 154(b) by 130 days.

(21) Appl. No.: 12/025,203

(22) Filed: Feb. 4, 2008

(65) Prior Publication Data

US 2009/0198848 A1  Aug. 6, 2009

(51) Int. Cl.
G06F 3/00 (2006.01)
G06F 5/00 (2006.01)
G06F 13/00 (2006.01)

(52) U.S. Cl. .............................. 710/72; 710/62; 710/8; 710/9; 710/10; 710/15; 710/38; 710/64; 710/37; 710/316; 710/300

(58) Field of Classification Search ............... 710/8–10, 710/15, 37, 38, 62, 72, 316, 64, 300
See application file for complete search history.

(56) References Cited

U.S. PATENT DOCUMENTS

| | | | |
|---|---|---|---|
| 5,841,483 A | 11/1998 | Shafer | |
| 5,900,916 A | 5/1999 | Pauley | |
| 6,204,887 B1 | 3/2001 | Hiroi | |
| 6,233,389 B1 | 5/2001 | Barton et al. | |
| 6,373,500 B1 | 4/2002 | Daniels | |
| 6,374,296 B1 | 4/2002 | Lim et al. | |
| 6,378,009 B1* | 4/2002 | Pinkston et al. | 710/62 |
| 6,609,034 B1 | 8/2003 | Behrens et al. | |
| 6,671,756 B1 | 12/2003 | Thomas et al. | |
| 7,047,344 B2* | 5/2006 | Lou et al. | 710/305 |
| 7,085,385 B2* | 8/2006 | Frantz et al. | 380/277 |
| 7,240,111 B2 | 7/2007 | VanHarlingen et al. | |
| 7,330,919 B2* | 2/2008 | Zhang et al. | 710/72 |
| 7,340,556 B2* | 3/2008 | Lou et al. | 710/316 |
| 7,418,524 B2* | 8/2008 | Beasley et al. | 710/2 |
| 7,428,606 B2* | 9/2008 | Liu et al. | 710/62 |
| 7,472,217 B2* | 12/2008 | Lou et al. | 710/316 |
| 7,493,421 B2* | 2/2009 | Huang | 710/12 |
| 7,502,878 B1* | 3/2009 | Wright | 710/37 |
| 7,555,570 B2* | 6/2009 | Hickey et al. | 710/8 |

(Continued)

FOREIGN PATENT DOCUMENTS

TW    526447 A    4/2003

(Continued)

Primary Examiner—Tammara Peyton
(74) Attorney, Agent, or Firm—Chen Yoshimura LLP

(57) ABSTRACT

An improved KVM switch is provided which enables computers to be connected to the KVM switch by reduced numbers of cables. It also supports transmission of digital audio signals between the computers and the KVM switch. A single USB port is provided to transmit keyboard, mouse, speaker and microphone signals between the KVM switch and each computer. The improved KVM switch is provided with one or more USB hubs to separate the keyboard/mouse signals and the digital audio signals, and one or more audio codecs to convert the audio signals from a digital form to an analog form and vice versa.

9 Claims, 3 Drawing Sheets

U.S. PATENT DOCUMENTS

| | | |
|---|---|---|
| 2002/0091850 A1 | 7/2002 | Perholtz et al. |
| 2003/0112248 A1 | 6/2003 | Pronkine |
| 2004/0015980 A1 | 1/2004 | Rowen et al. |
| 2004/0160438 A1 | 8/2004 | Shih et al. |
| 2005/0052465 A1* | 3/2005 | Moore et al. ............... 345/603 |
| 2005/0066000 A1* | 3/2005 | Liaw et al. .................. 709/204 |
| 2005/0091360 A1 | 4/2005 | Chen et al. |
| 2005/0132403 A1 | 6/2005 | Lee et al. |
| 2006/0020732 A1 | 1/2006 | Charna |
| 2007/0079008 A1* | 4/2007 | Leibovich et al. ........... 709/246 |
| 2007/0297442 A1* | 12/2007 | Chang et al. ................ 370/462 |
| 2008/0005421 A1* | 1/2008 | Chang et al. ................ 710/62 |

FOREIGN PATENT DOCUMENTS

| | | |
|---|---|---|
| TW | 556089 A | 10/2003 |
| TW | 220824 A | 9/2004 |
| TW | 220842 A | 9/2004 |

* cited by examiner

KEYBOARD VIDEO MOUSE (KVM) SWITCH BETWEEN PLURALITY OF INTERNAL USB HUBS EACH ASSOCIATED WITH PLURALITY OF AUDIO CODECS CONNECTED TO THE DOWNSTREAM PORT OF ASSOCIATED USB HUB

BACKGROUND OF THE INVENTION

1. Field of the Invention

This invention relates to KVM (keyboard video mouse) switches, and in particular, it relates to a KVM switch with internal USB hubs that can be connected to computers with a reduced number of cables.

2. Description of the Related Art

KVM (keyboard video mouse) switches are devices that allow one user console to be connected to and communicate with multiple computers. In a typical KVM configuration, one or more consoles and a plurality of computers (such as PCs) are connected to a KVM switch, and each console can selectively communicate with any one of the computers. Each console includes a plurality of user interface devices such as a keyboard, a mouse, a monitor, a microphone and a speaker. In some conventional KVM switches, shown in FIG. 1, each user interface device of the console is connected to the KVM 100 switch by a separate cable. Thus, as shown in FIG. 1, the user console is connected to the KVM switch by a VGA (video) cable C1 for the monitor, a cable C2 for the speaker, a cable C3 for the microphone, a cable C4 for the keyboard, and a cable C5 for the mouse. The keyboard and mouse cables are USB cables in this example. Likewise, each computer (PC) is connected to the KVM switch by multiple cables to transmit various signals. As shown in FIG. 1, the first computer PC1 is connected to the KVM switch by a VGA (video) cable A1 for the monitor signals, a cable A2 for the speaker signals, a cable A3 for the microphone signals, a cable A4 for the keyboard signals, and a cable A5 for the mouse signals. The keyboard and mouse cables are USB cables in this example. The second computer PC2 is similarly connected to the KVM switch. It can be seen that a large number of cables are used, making it inconvenient to manage. Although FIG. 1 schematically shows one switch 101, various signals may be switched separately within the KVM switch. For example, the keyboard/mouse signals (which are digital signals) are typically switched separately from the video signals (which are analog signals).

In the conventional configuration shown in FIG. 1, in addition to a large number of cables connecting the computers with the KVM switch, another disadvantage is that the audio signals (speaker signals and microphone signals) are transmitted between the computers and the KVM switch by analog cables. Such cables often cause distortions in audio signals.

SUMMARY OF THE INVENTION

The present invention is directed to a KVM switch that substantially obviates one or more problems due to limitations and disadvantages of the related art.

An object of the present invention is to provide a KVM switch that allows the computers to be connected to it with reduced number of cables.

Another object of the present invention is to provide a KVM switch that supports digital audio signal transmission between the KVM switch and the computers with increased audio quality.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a KVM switch which includes: one or more console ports each for connecting to a user console, each console port including one or more input device ports for transmitting input device signals and one or more audio device ports for transmitting analog audio signals; a plurality of computer ports each for connecting to a computer, each computer port including a single USB (universal serial bus) port for transmitting input device signals and digital audio signals; a switching device having one or more console-side ports and a plurality of computer-side ports, each computer-side port being connected to the USB port of one of the computer ports of the KVM switch, the switching device selectively connecting each console-side port with one of the computer-side ports; one or more USB hubs each associated with one of the console ports, each USB hub having an upstream port and a plurality of downstream ports, the upstream port being connected to one of the console-side ports of the switching device, one or more of the downstream ports being connected to the input device ports of the associated console port; and one or more audio codecs each associated with one of the console ports and one of the USB hubs, each audio codec having a digital end and one or more analog ends, the digital end being connected to one of the downstream ports of the associated USB hub, the analog ends being connected to the audio device ports of the associated console port.

In another aspect, the present invention provides a KVM switch which includes: one or more console ports each for connecting to a user console, each console port including one or more input device ports for transmitting input device signals and one or more audio device ports for transmitting analog audio signals; a plurality of computer ports each for connecting to a computer, each computer port including a single USB (universal serial bus) port for transmitting input device signals and digital audio signals; a plurality of USB hubs each associated with one of the computer ports, each USB hub having an upstream port and a plurality of downstream ports, the upstream port being connected to the USB port of the associated computer port; a plurality of audio codecs each associated with one of the USB hubs, each audio codec having a digital end and one or more analog ends, the digital end being connected to one of the downstream ports of the associated USB hub; an audio mixer having a plurality of input ports and an output port for mixing audio signals present at the input ports and providing the mixed signals to the output port, each input port being connected to one of the analog ends of one of the audio codecs, the output port being connected to one of the audio device ports of each console port of the KVM switch; and a switching device having one or more console-side ports and a plurality of computer-side ports, each computer-side port being connected to one of the downstream ports of one of the USB hubs, each console-side port being connected to one of the input device ports of one of the console ports of the KVM switch, the switching device selectively connecting each console-side port with one of the computer-side ports.

In yet another aspect, the present invention provides a KVM switch which includes: one or more console ports each for connecting to a user console, each console port including one or more input device ports for transmitting input device signals and one or more audio device ports for transmitting digital audio signals; a plurality of computer ports each for connecting to a computer, each computer port including a single USB (universal serial bus) port for transmitting input device signals and digital audio signals; a switching device having one or more console-side ports and a plurality of computer-side ports, each computer-side port being connected to the USB port of one of the computer ports of the KVM switch, the switching device selectively connecting each console-side port with one of the computer-side ports; and one or more USB hubs each associated with one of the console ports, each USB hub having an upstream port and a plurality of downstream ports, the upstream port being connected to one of the console-side ports of the switching device, at lease one the downstream ports being connected to one of the input device ports of the associated console port, and at least another one of the downstream ports being connected to one of the audio device ports of the associated console port.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, detailed illustrative embodiments of the present invention are disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

According to embodiments of the present invention, the audio signals are transmitted between the computers and an improved KVM switch in digital form over a USB cable. In addition, the digital audio signals, the keyboard signals and the mouse signals are transmitted over a single USB cable between each computer and the improved KVM switch. The improved KVM switch is provided with one or more USB hubs and one or more audio codecs.

Figure 2:
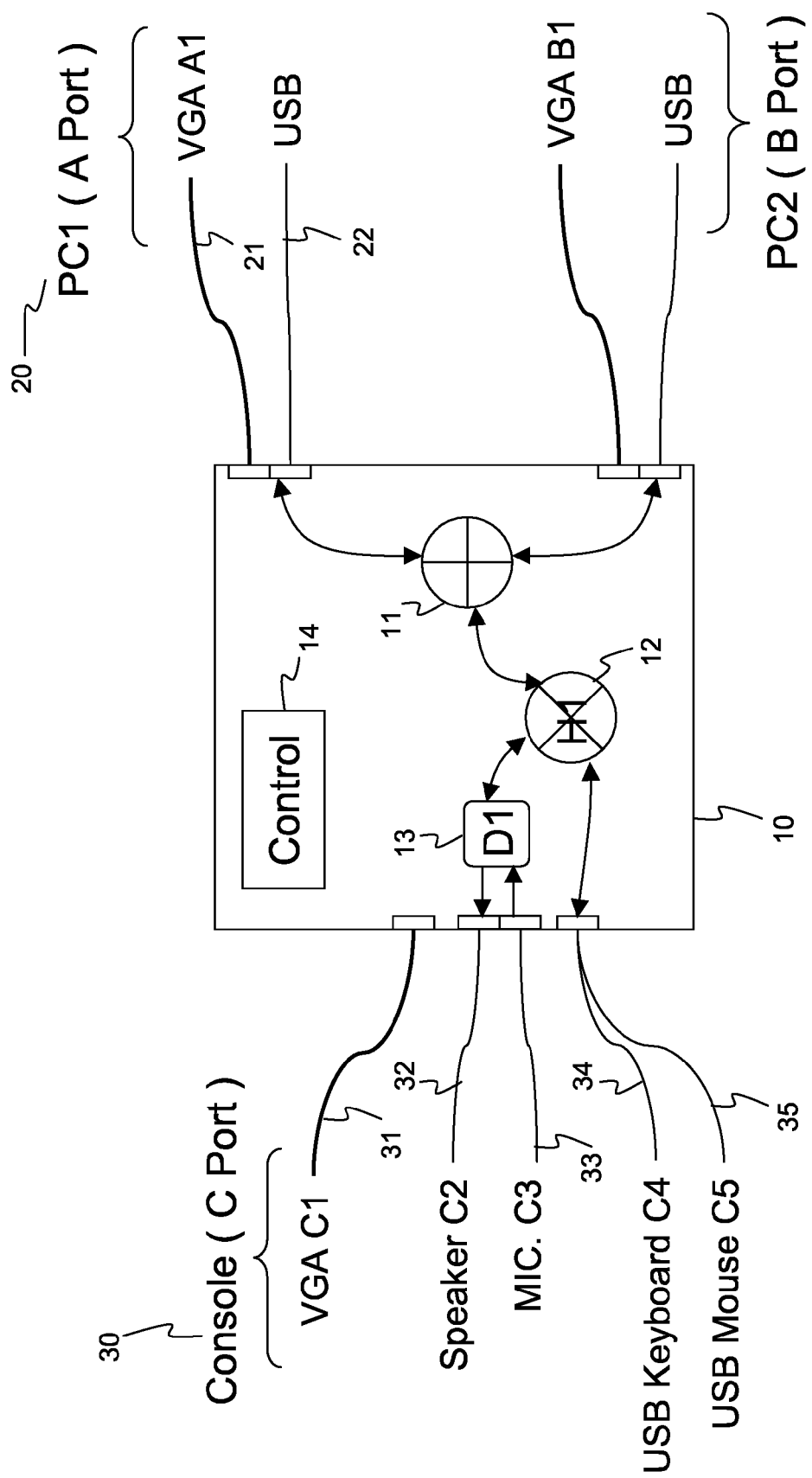
FIG. 2 schematically illustrates a KVM switch system according to an embodiment of the present invention.

An embodiment of the present invention is described with reference to FIG. 2. A KVM switch 10 is show as having three ports: A Port and B Port for two computers 20 and C Port for a console 30. Of course, the KVM switch 10 may have more than two computer ports and more than one console port. The word "port," when used in the term "A port," etc., refers to a collection of physical ports (connectors). In the example of FIG. 2, each computer port includes a video port and an USB port, and each console port includes a video port, a speaker port, a microphone port, a keyboard port and a mouse port.

Figure 1:
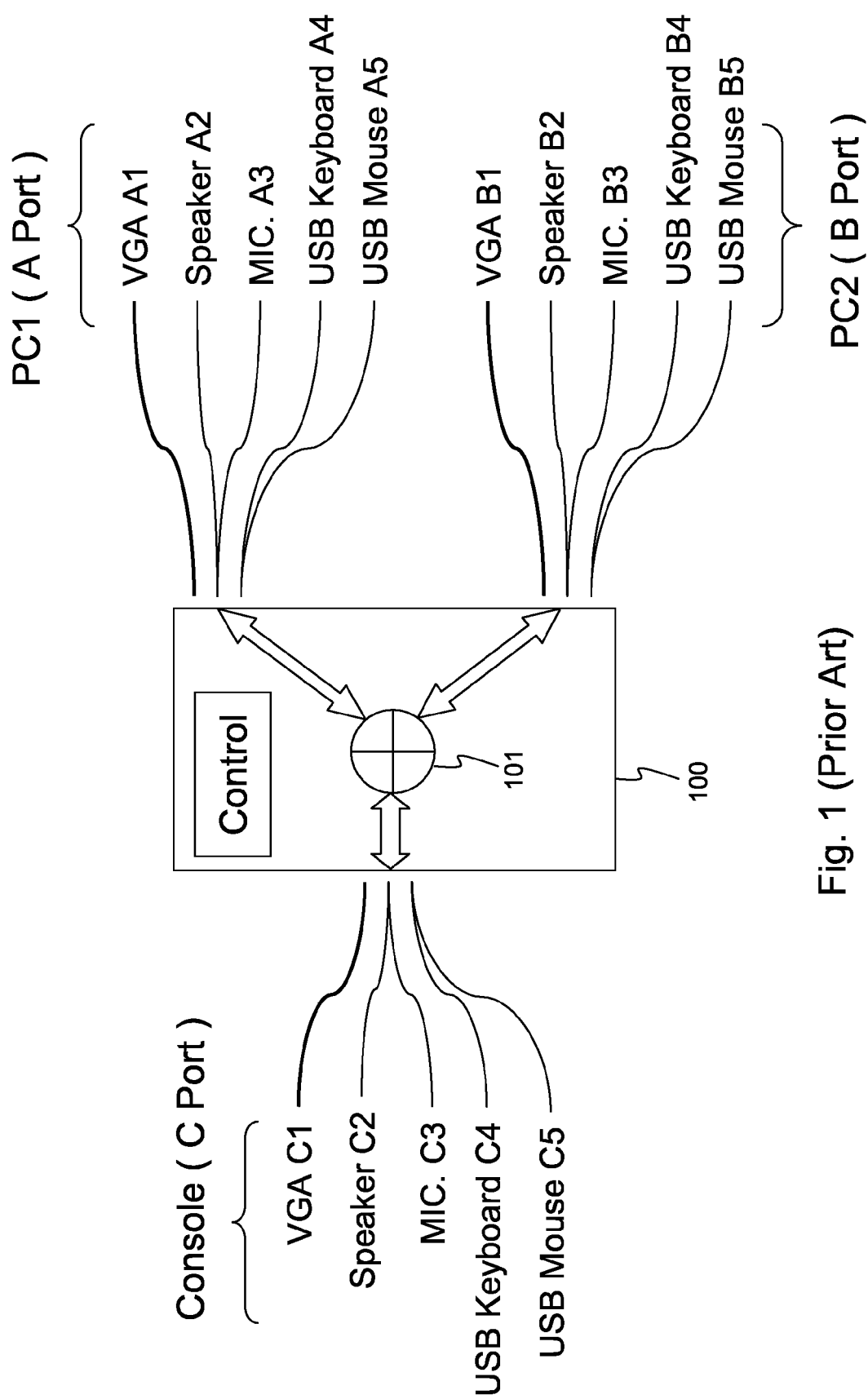
FIG. 1 schematically illustrates a conventional KVM switch system.

Each computer 20 is connected to the KVM switch 10 by two cables, including a video (VGA) cable 21 for transmitting video signals and a single USB cable 22 for transmitting keyboard, mouse, speaker and microphone signals. Unlike in the conventional system shown in FIG. 1, the speaker and microphone signals transmitted between the computers 20 and the KVM switch 10 here are digital signals. The single USB cable 22 is plugged into a USB port of the computer 20 and a USB port of a computer port of the KVM switch 10. The console 30 includes a plurality of user interface devices such as a keyboard, a mouse, a monitor, a microphone and a speaker. These user interface devices are connected to the KVM switch 10 by a plurality of cables, including a VGA cable 31 for transmitting video signals, a speaker cable 32 for transmitting speaker signals, a microphone cable 33 for transmitting microphone signals, a USB cable 34 for transmitting keyboard signals, and a USB cable 35 for transmitting mouse signals. The speaker and microphone signals transmitted between the console 30 and the KVM switch 10 are analog audio signals.

The KVM switch 10 includes a switching device 11, a USB hub 12, an audio codec 13, and a control section 14. The switching device 11 has one or more console-side ports and multiple computer-side ports, and operates (under the control of the control section 14) to selectively connect each console-side port with a computer-side port. The switching device 11 may be implemented by a crosspoint switch (especially when there are multiple console-side ports), or any other suitable structure. It may also include signal processing functions. Each computer-side port of the switching device 11 is connected to the USB port of a computer port of the KVM switch. Each console-side port of the switching device 11 is connected to the upstream port of the USB hub 12. The keyboard and mouse signals from the console 30 are connected to one or more downstream ports of the USB hub 12. The audio codec 13 is connected to another downstream port of the USB hub 12. The audio codec 13 operates to convert analog audio signals from the microphone into digital signals (USB format) for input to the USB hub 12, and convert digital audio signals from the USB hub into analog audio signals for the speaker. The digital end of the audio codec 13 is connected to the USB hub 12 and the two analog ends of the codec 13 are connected to the speaker and microphone ports for the console 30. If the KVM switch 10 has multiple console ports, then multiple audio codecs 13 and multiple USB hubs 12 are provided, and each pair of audio codec 13 and USB hub 12 is associated with one console port.

In operation, when a computer 20 is connected to a console 30 by the switching device 11, the computer 20 acts as a USB master and communicates with the keyboard, the mouse, and the audio codec 13 which act as USB devices. The codec 13 converts digital audio signals from the computer 20 (via the switching device 11 and the USB hub 12) to analog audio signals for the speaker, and converts analog audio signals from the microphone to digital signals to be transmitted to the computer 20 (via the USB hub 12 and the switching device 11).

Although not shown in FIG. 2, the KVM switch 10 further includes a video signal switching system for switching the video signals between the computers 20 and the console 30. Alternatively, the video signals may be switched by the same switching device 11. The video signal switching system, as well as other necessary or optional components (not shown) of the KVM switch 10, can be implemented by conventional components familiar to those skilled in the relevant art and will not be described in this disclosure.

Figure 3:
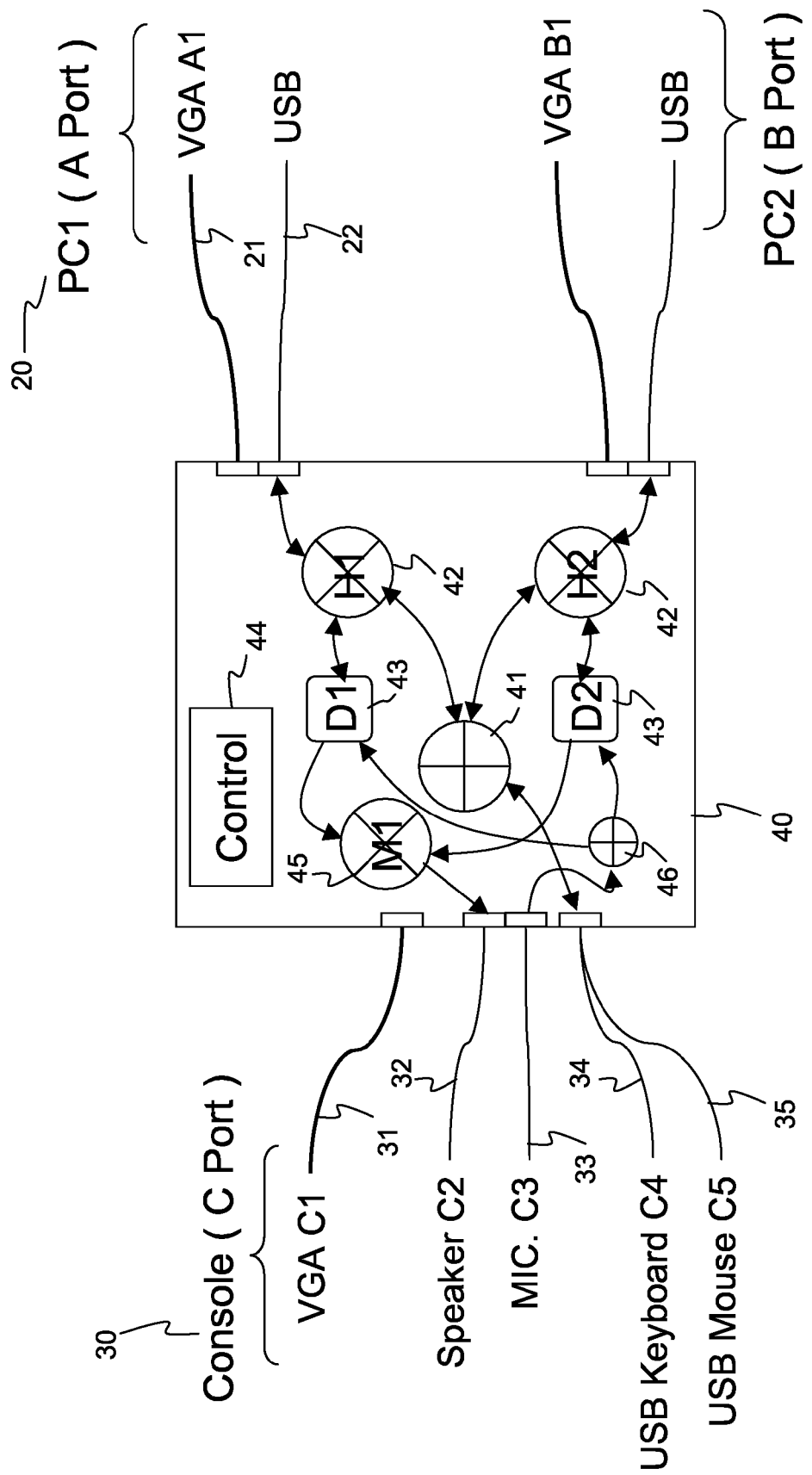
FIG. 3 schematically illustrates a KVM switch system according to another embodiment of the present invention.

FIG. 3 shows another embodiment of the present invention. In this embodiment, an audio mixer is provided in the KVM switch 40 so that the speaker signals from multiple computers 20 are simultaneously heard by the user at the console 30. A KVM switch with an audio mixer is described in U.S. Pat. No. 7,240,111. One advantage of providing the speaker signals from all computers simultaneously to the console(s) is that while the user is communicating with one computer using the keyboard and mouse, the user can be informed of events occurring at other computers by audio signals such as various tones, rings generated by an incoming Internet-based telephone signal, etc.

As shown in FIG. 3, the KVM switch 40 includes a switching device 41, a plurality of USB hubs 42, a plurality of audio codecs 43, an audio mixer 45, an audio switch 46, and a control section 44. The switching device 41, USB hubs 42, audio codecs 43 and control section 44 are similar to the corresponding components in the embodiment shown in FIG. 2. The audio mixer 45 is a device that mixes the audio signals at multiple input ports and provides the mixed audio signal to its output port.

One USB hub 42 and one audio codec 43 is provided for each computer port of the KVM switch 40. The upstream port of each USB hub 42 is connected to the USB signals from a computer 20, and one of the downstream ports of each USB hub is connected to the digital end of the corresponding audio codec 43. Another downstream port of the USB hub 42 is connected to a computer-side port of the switching device 41. The console-side ports of the switching device 41 are connected to the keyboard and mouse signals of the console 30. The analog end of each codec 43 is connected to an input port of the mixer 45, while the output port of the mixer is provided to the speaker of the console 20. If multiple consoles 30 are present, the output of the mixer 45 is connected to the audio ports of all consoles. Thus, the speaker signals from all computers 20 are simultaneously provided to all consoles. The audio switch 46 has one or more input ports and multiple output ports. Each input port of the audio switch 46 is connected to the microphone port of a console port. Each output port of the audio switch 46 is connected to an analog end of one audio codec 43. The audio switch 46 operates to switch the audio signal from the microphone of each console 30 to one of the computers 20 via the associated set of codec 43 and USB hub 42.

In the embodiments shown in FIGS. 2 and 3, the keyboard and mouse signals are always routed together. More generally, they are referred to as the input device signals and are connected to the input device port of the console port of the KVM switch. The input device port of the console port of the KVM switch will have either one or two USB connectors depending on whether the keyboard and mouse signals are connected to the same USB port or two separate USB ports on the KVM switch. In the embodiment of FIG. 2, either one or two downstream ports of the USB hub 12 will be connected to the input device port of the console port of the KVM switch 10 depending on the number of USB ports in each input device port. In the embodiment of FIG. 3, if the input device port has one USB port, each console-side port and each computer-side port of the switching device 41 will have one USB port, and one downstream port of each USB hub 42 will be connected to the switching device 41. On the other hand, if the input device port has two USB port for separate keyboard and mouse signals, each console-side port and each computer-side port of the switching device 41 will have two USB ports, and two downstream port of each USB hub 42 will be connected to the switching device 41.

It can be seen that by providing one or more audio codecs 13/43 in the improved KVM switch 10/40, the audio signals can be transmitted between the computers 20 and the KVM switch 10/40 as digital signals, thereby reducing distortions in the transmission and improving audio quality. Further, because the audio signals are transmitted as digital signals, they can be transmitted over the same USB cable as the keyboard and mouse signals, thereby reducing the number of cables connecting the computers 20 and the KVM switch 10/40.

In the above described embodiments, the audio codec 13/43 are provided as a part of the KVM switch 10/40 so that analog audio signals are transmitted between the KVM switch 10/40 and the audio devices of the console. Alternatively, although in FIG. 3 the audio mixer 45 is located between the speaker and the codecs 43, it is possible to locate the codec 43 between the audio mixer 45 and the speaker. In such a case, only one codec 43 would be required and the audio mixer would operate on digital audio signals. Likewise, it is possible locate the codec 43 between the audio switch 46 and the audio switch 46. Further, if the speaker and microphone devices have built-in audio codecs, the audio codecs 13/43 can be omitted from the KVM switch 10/40.

In the embodiments of FIGS. 2 and 3, the console 30 is shown to have both a keyboard and a mouse. It is possible for the console to have only a keyboard or only a mouse. More generally, the console has one or more input devices, which may include a keyboard, a mouse, and/or other suitable devices. Further, the console 30 is shown to have both a speaker and a microphone, but the microphone is optional. More generally, the speaker and microphone (if present) are referred to as audio devices.

It should be noted that various other components not shown in the figures may be present in the KVM switch, including various signal processing circuitry. In this respect, when a component is said to be connected to another component, it should be understood that other components may be connected in between. In other words, the term "connected" includes direct connection and indirect connection.

The USB communication standard is used in the above descriptions as an example. A majority of peripheral devices such as keyboards and mice today use the USB standard for communication. However, other communication standard, such as IEEE 1394, can also be used to implement the invention.

It will be apparent to those skilled in the art that various modification and variations can be made in the improved KVM switch of the present invention without departing from the spirit or scope of the invention. Thus, it is intended that the present invention cover modifications and variations that come within the scope of the appended claims and their equivalents.

What is claimed is:

1. A KVM (keyboard video mouse) switch comprising:
 one or more console ports each for connecting to a user console, each console port including one or more input device ports for transmitting input device signals and one or more audio device ports for transmitting analog audio signals;
 a plurality of computer ports each for connecting to a computer, each computer port including a single USB (universal serial bus) port for transmitting input device signals and digital audio signals;
 a plurality of USB hubs each associated with one of the computer ports, each USB hub having an upstream port and a plurality of downstream ports, the upstream port being connected to the USB port of the associated computer port;

a plurality of audio codecs each associated with one of the USB hubs, each audio codec having a digital end and one or more analog ends, the digital end being connected to one of the downstream ports of the associated USB hub;

an audio mixer having a plurality of input ports and an output port for mixing audio signals present at the input ports and providing the mixed signals to the output port, each input port being connected to one of the analog ends of one of the audio codecs, the output port being connected to one of the audio device ports of each console port of the KVM switch; and a switching device having one or more console-side ports and a plurality of computer-side ports, each computer-side port being connected to one of the downstream ports of one of the USB hubs, each console-side port being connected to one of the input device ports of one of the console ports of the KVM switch, the switching device selectively connecting each console-side port with one of the computer-side ports.

2. The KVM switch of claim 1, wherein the digital audio signals transmitted by the single USB port of each computer port include digital speaker signals from the corresponding computer and digital microphone signals to the corresponding computer.

3. The KVM switch of claim 2, wherein each of the audio codecs converts the digital speaker signals from the associated USB hub into analog speaker signals for the audio mixer.

4. The KVM switch of claim 3, wherein the one of the audio device ports of each console port that is connected to the audio mixer is a speaker port for connecting to a speaker of the console, and wherein the audio mixer mixes the analog speaker signals from all audio codecs and outputs the mixed analog speaker signals to the speaker ports of all console ports.

5. The KVM (keyboard video mouse) switch of claim 1, further comprising an audio switch having one or more input ports and a plurality of output ports, each input port being connected to another one of the audio device ports of one of the console ports of the KVM switch, each output port being connected to another one of the analog ends of one of the audio codecs, the audio switch selectively connecting each of its input ports with one of its output ports.

6. The KVM switch of claim 5, wherein the other one of the audio device ports of each console port that is connected to the audio switch is a microphone port for connecting to a microphone of the console.

7. The KVM switch of claim 6, wherein each of the audio codecs converts analog microphone signals from the audio switch to digital microphone signals for input to the associated USB hub.

8. The KVM switch of claim 5, further comprising a control section for controlling the switching device and the audio switch.

9. The KVM switch of claim 1, wherein each console port includes a video port and each computer port includes a video port.

* * * * *